United States Patent
Gill et al.

(10) Patent No.: US 7,042,664 B2
(45) Date of Patent: May 9, 2006

(54) METHOD AND SYSTEM FOR HOST PROGRAMMABLE DATA STORAGE DEVICE SELF-TESTING

(75) Inventors: Bradley J. Gill, Longmont, CO (US); Kenneth J. Ordes, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 149 days.

(21) Appl. No.: 10/764,943

(22) Filed: Jan. 26, 2004

(65) Prior Publication Data

US 2005/0162767 A1    Jul. 28, 2005

(51) Int. Cl.
*G11B 27/36* (2006.01)
(52) U.S. Cl. .................. 360/31; 360/69; 360/77.02; 360/53
(58) Field of Classification Search ................ 360/31, 360/69
See application file for complete search history.

(56) References Cited

U.S. PATENT DOCUMENTS

| | | | |
|---|---|---|---|
| 4,979,055 A | | 12/1990 | Squires |
| 6,084,733 A | * | 7/2000 | Ohzeki et al. ............. 360/53 |
| 6,600,614 B1 | * | 7/2003 | Lenny et al. ............. 360/31 |
| 6,650,492 B1 | * | 11/2003 | Lenny et al. ............. 360/31 |
| 6,895,500 B1 | * | 5/2005 | Rothberg ................ 360/31 |

* cited by examiner

*Primary Examiner*—David Hudspeth
*Assistant Examiner*—Natalia Figueroa
(74) *Attorney, Agent, or Firm*—Westman, Champlin & Kelly

(57) ABSTRACT

A method and system for providing programmable self-testing of a data storage device comprises selecting one or more host programmable tests stored in memory in the data storage device by setting data in a first log in memory of the data storage device. Parameters for execution of the one or more host programmable tests are set by setting one or more values in a second log in memory of the data storage device. The one or more host programmable tests on the data storage device are then executed. Results of the one or more host programmable tests are stored in a third log in memory of the data storage device.

20 Claims, 10 Drawing Sheets

METHOD AND SYSTEM FOR HOST PROGRAMMABLE DATA STORAGE DEVICE SELF-TESTING

FIELD OF THE INVENTION

This application relates generally to data storage devices and more particularly to host programmable self-testing of a data storage device.

BACKGROUND OF THE INVENTION

A data storage device such as a magnetic, optical, or magneto-optical drive includes a rotating storage medium. For example, modem disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors.

The read/write transducer, e.g. a magnetoresistive read/write head, is used to transfer data between a desired track and an external environment. The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator arm is driven by a control signal fed to the voice coil motor (VCM) at the rear end of the actuator arm. A servo system is used to sense the position of the actuator and control the movement of the head above the disc using servo signals read from a disc surface in the disc drive. The servo system relies on servo information stored on the disc. The signals from this information generally indicate the present position of the head with respect to the disc, i.e., the current track position. The servo system uses the sensed information to maintain head position or determine how to optimally move the head to a new position centered above a desired track. The servo system then delivers a control signal to the VCM to rotate the actuator to position the head over a desired new track or maintain the position over the desired current track.

With time, as these components age and wear, problems may develop in the operation of the data storage device. However, field failure analysis of these problems is sometimes difficult. While various types of test can provide accurate analysis of the problems, they typically require the device to be removed from the host for testing. Removal of the device from the host for testing can result in additional problems. For example, removing the device from the host can cause new problems or failures. Additionally, using a different interface for failure analysis may mask some problems and cause other new problems. Finally, some problems may be host specific and testable only while the device is connected to the host.

Accordingly there is a need for a programmable self-test of the data storage device while the device is still connected to the host. The present invention provides a solution to this and other problems, and offers other advantages over the prior art.

SUMMARY OF THE INVENTION

Against this backdrop the present invention has been developed. According to one aspect of the present invention, a method of executing one or more self-tests on a data storage device comprises selecting one or more host programmable tests stored in memory in the data storage device by setting data in a first log in memory of the data storage device. Parameters for execution of the one or more host programmable tests are set in one or more values in a second log in memory of the data storage device. The one or more host programmable tests on the data storage device are then executed. Results of the one or more host programmable tests are stored in a third log in memory of the data storage device.

According to another aspect of the present invention, a data storage device comprises one or more read/write heads, a storage medium accessible by the one or more read/write heads, a processor coupled with the read/write heads to access data on the storage medium, and a memory connected with and readable by the processor. The memory has stored therein one or more host programmable tests overwritten onto vendor specific portions of a self-monitoring program that are executable by the data storage device while the data storage device is connected with a host.

These and various other features as well as advantages which characterize the present invention will be apparent from a reading of the following detailed description and a review of the associated drawings.

DETAILED DESCRIPTION

Embodiments of the present invention will be discussed with reference to a magnetic disc drive. One skilled in the art will recognize that the present invention may also be applied to any data storage device, such as an optical disc drive, a magneto-optical disc drive, or other data storage device having multiple heads for accessing data on multiple storage media.

Figure 1:
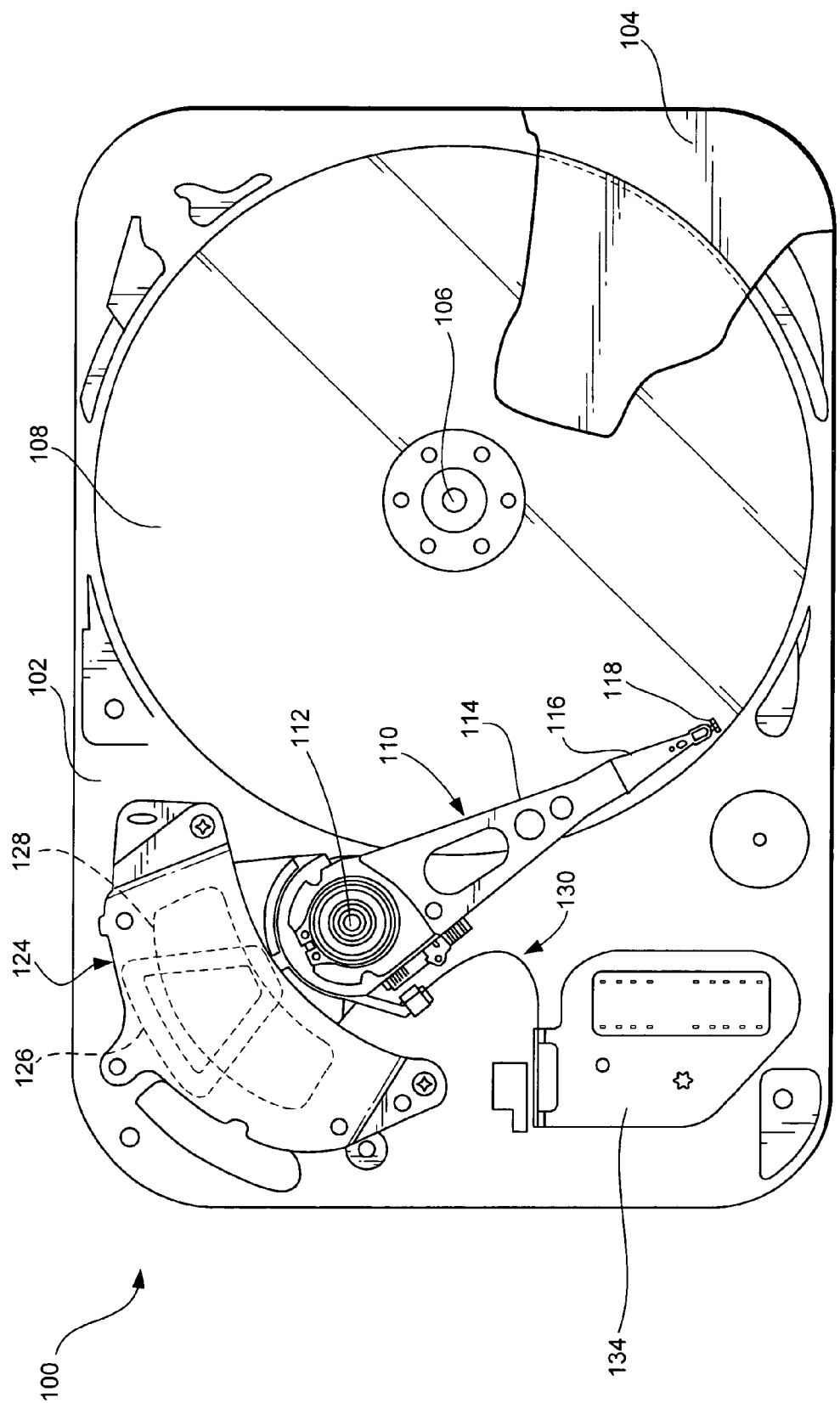
FIG. 1 is a plan view illustrating the primary internal components of a disc drive incorporating one of the various embodiments of the present invention.

FIG. 1 is a plan view illustrating the primary internal components of a disc drive incorporating one of the various embodiments of the present invention. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes a fluid bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved away from portions of the disk 108 containing data when the drive motor is de-energized. The heads 118 are secured over portions of the disk not containing data through the use of an actuator latch arrangement and/or ramp, which prevents inadvertent rotation of the actuator assembly 110 when the drive discs 108 are not spinning.

A flex assembly 130 provides the requisite electrical connection paths for the actuator assembly 110 while allowing pivotal movement of the actuator assembly 110 during operation. The flex assembly includes a printed circuit board 134 to which a flex cable leading to the head is connected; the flex cable leading to the heads 118 being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
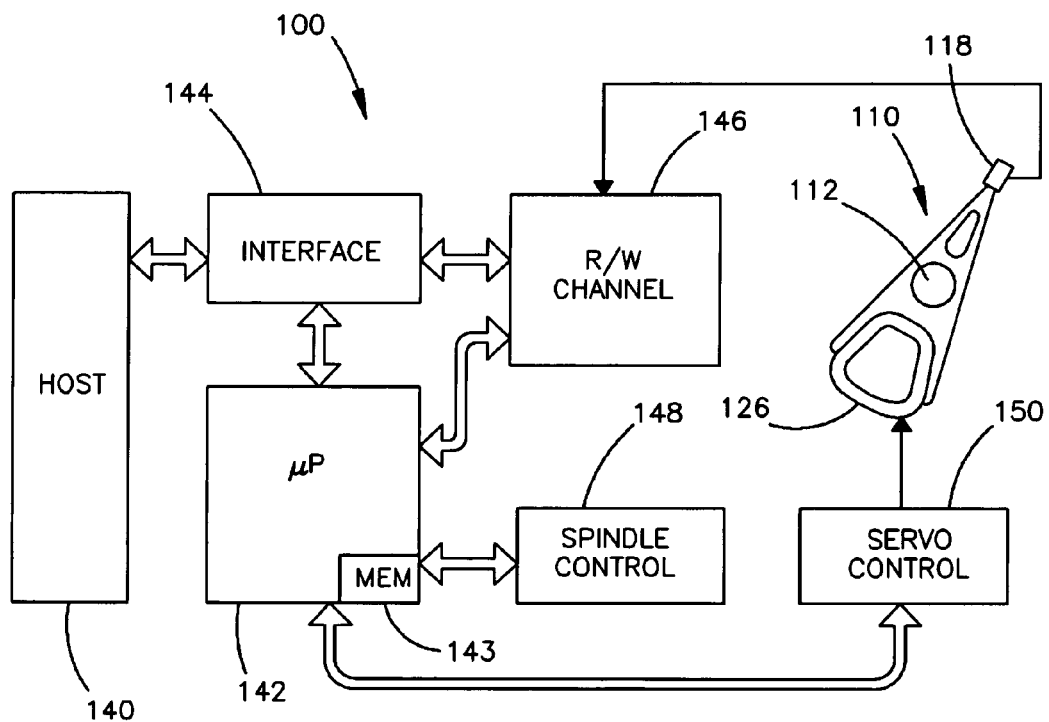
FIG. 2 is a control block diagram for the disc drive shown in FIG. 1 illustrating the primary functional components.

FIG. 2 is a control block diagram for a disc drive illustrating the primary functional components of a disc drive incorporating one of the various embodiments of the present invention and generally showing the main functional circuits which are resident on the disc drive printed circuit board and used to control the operation of the disc drive 100. The disc drive 100 is operably connected to a host computer 140 in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle motor control circuit 148, which typically electrically commutates the spindle motor 106 (FIG. 1) through the use, typically, of back electromotive force (BEMF) sensing. During a seek operation, wherein the actuator 110 moves the heads 118 between tracks, the position of the heads 118 is controlled through the application of current to the coil 126 of the voice coil motor 124. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor coil 126, thereby causing the actuator assembly 110 to be pivoted.

Data is transferred between a host computer 140 or other device and the disc drive 100 by way of an interface 144, which typically includes a buffer to facilitate high speed data transfer between the host computer 140 or other device and the disc drive 100. Data to be written to the disc drive 100 is thus passed from the host computer 140 to the interface 144 and then to a read/write channel 146, which encodes and serializes the data and provides the requisite write current signals to the heads 118. To retrieve data that has been previously stored in the data storage device 100, read signals are generated by the heads 118 and provided to the read/write channel 146, which performs decoding and error detection and correction operations and outputs the retrieved data to the interface 144 for subsequent transfer to the host computer 140 or other device.

Stored in memory 143 may be a self-monitoring program such as the Self-Monitoring, Analysis, and Reporting Technology (SMART) feature set. This, and similar programs, monitor a variety of parameters of the data storage device during normal operation. These programs contain a number of vendor specific extensions or tests that are not typically used after manufacture of the device. Additionally, these self-monitoring programs utilize a number of easily accessible memory locations or logs that may be used to store information. Generally, embodiments of the present invention utilize the vendor specific portions of these self-monitoring programs and logs to provide host programmable self-test.

Figure 3:
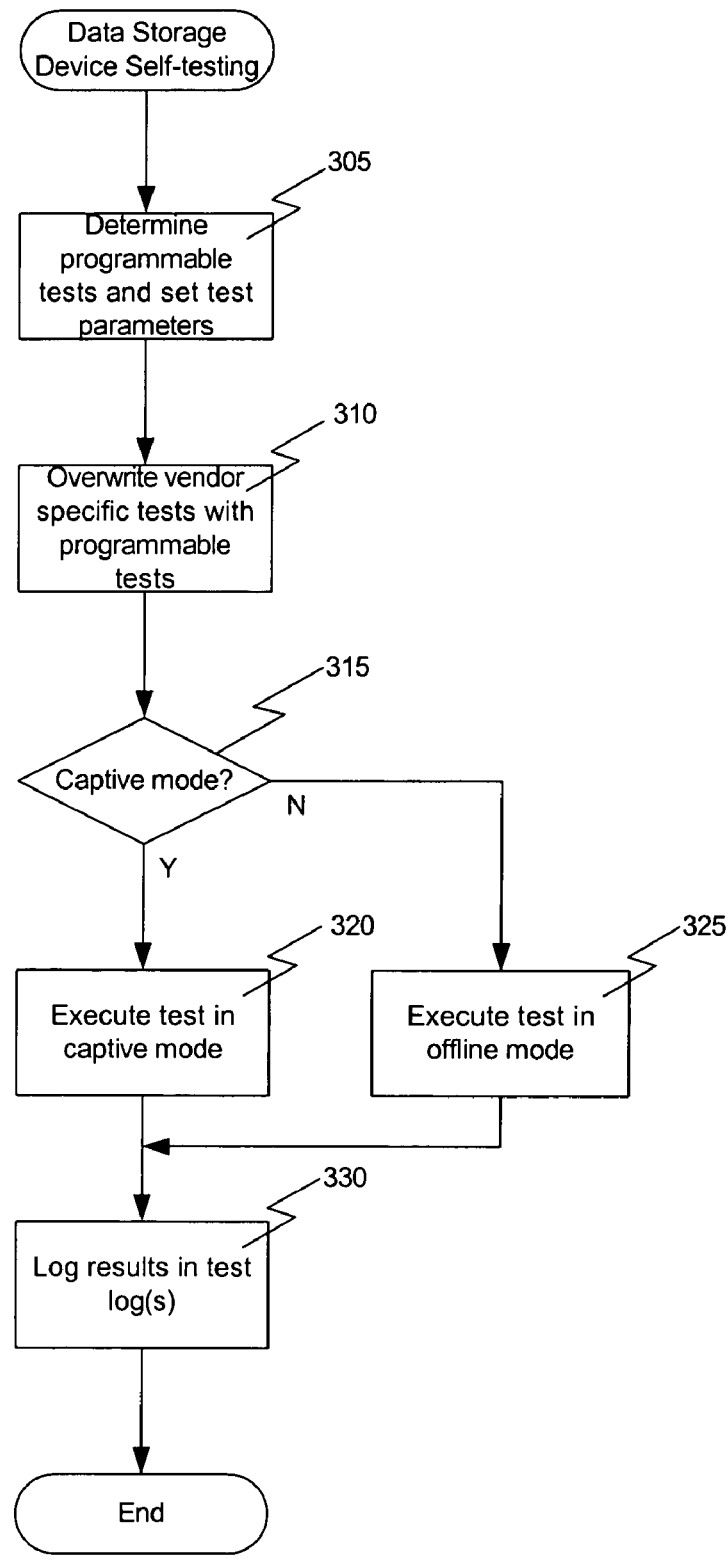
FIG. 3 is a flowchart illustrating data storage device self-testing according to one embodiment of the present invention.

FIG. 3 is a flowchart illustrating data storage device self-testing according to one embodiment of the present invention. Here, processing begins with determination operation 305. Determination operation 305 comprises selecting and programming boundary parameters of one or more host programmable tests provided with the data storage device. That is, the supplier of the data storage device determines which host programmable tests will be made available on the device to be executable by the data storage device while the data storage device is connected with a host. When executed, the user, via the host with which the data storage device is connected, can select one or more of the test to be executed as well as setting parameters for the execution of those tests. In one example, the type of test to be performed may be indicated by the user setting data in a log in the memory of the data storage device. Additionally, setting parameters for execution of the one or more host programmable tests may be done by the user setting one or more values in a second log in memory of the data storage device.

Examples of these tests will be discussed below with reference to FIGS. 4–9. Host programmable tests that may be available include, but are not limited to, a Position Error Signal (PES) test, a head error rate test, a read verify reserve track data test, and others as will be discussed below. Control then passes to query operation 315.

Query operation 315 comprises determining the mode of operation the selected tests shall be executed in. In some devices, tests may be executed in two modes of operation, such as of f line and captive. If at query operation 315 a determination is made that the test mode is captive mode, control passes to execute operation 320.

Execute operation 320 comprises executing the selected tests in a captive mode. In captive mode, tests are executed while host-initiated commands are ignored until the data storage device has completed all selected tests. Control then passes to log operation 330.

If, at query operation 315, a determination is made that the test mode is not captive mode, control passes to execute operation 325. Execute operation 325 comprises executing the selected tests in an offline mode. In offline mode tests can be executed and data collected when the data storage device is not servicing host-initiated commands. Control then passes to log operation 330.

Log operation 330 comprises writing the data collected during execution of the selected tests to the appropriate vendor specific logs. For example, the self-monitoring program stored in memory in the data storage device may be the Self-Monitoring, Analysis, and Reporting Technology (SMART) program or another similar program. SMART provides a number of vendor specific tests that are not used after manufacture of the device as well as a number of logs stored in the memory of the device. The host programmable tests may be overwritten on these vendor specific tests, at step 310. Additionally, as will be seen below, the logs may be used to store control information and results for the host programmable tests.

Figure 4:
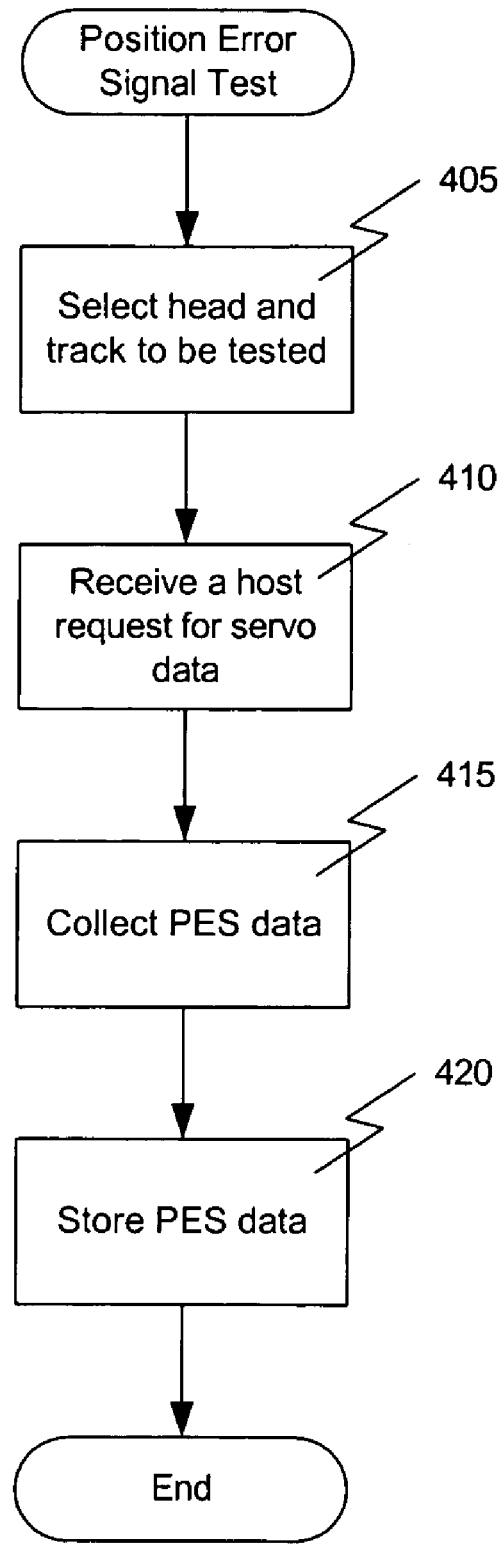
FIG. 4 is a flowchart illustrating a position error signal test that may be part of the self-test illustrated in FIG. 3.

FIG. 4 is a flowchart illustrating a Position Error Signal (PES) test that may be part of the self-test illustrated in FIG. 3. In this example, processing begins with select operation 405. Select operation 405 comprises selecting a read/write head of the data storage device and a track of a storage medium in the data storage device to be tested where the selected track is accessible by the selected read/write head. Control then passes to receive operation 410.

Receive operation 410 comprises receiving a host request for servo data from the selected track. That is, through the host, a tester may request one or more servo sectors of the storage medium to be read and tested. Control the passes to read operation 415.

Read operation 415 comprises collecting PES data from the selected track while reading the requested servo data. In some cases, the PES data may be calculated as a percentage off-track value for the head and track being tested. Control then passes to store operation 420.

Store operation 420 comprises storing the collected PES data in a log in memory of the data storage device. That is, the collected PES data may be stored in a log such as the SMART logs where it can be accessed via the host or another means.

Figure 5:
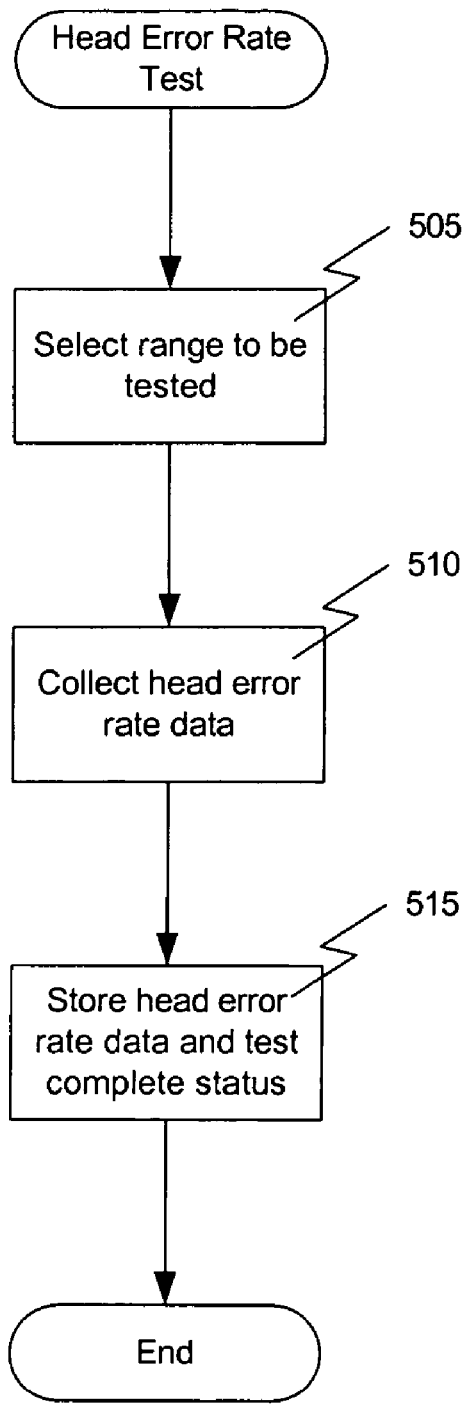
FIG. 5 is a flowchart illustrating a head error rate test that may be part of the self-test illustrated in FIG. 3.

FIG. 5 is a flowchart illustrating a head error rate test that may be part of the self-test illustrated in FIG. 3. Processing begins with select operation 505. Select operation 505 comprises selecting a range of addresses to be tested on a storage medium in the data storage device. For example, a starting and ending address, such as a Logical Block Address (LBA), may be specified. In some cases, these addresses may be set by the tester in logs, such as SMART logs, in the memory of the data storage device. Control then passes to read operation 510.

Read operation 510 comprises collecting head error rate data for the range of addresses selected. That is, as data is read from the storage medium between the starting and ending addresses, error rate information is collected. Control then passes to store operation 515.

Store operation 515 comprises storing the head error rate data and a test complete status in a log in memory of the data storage device. That is, the collected error rate data may be stored in a log such as the SMART logs where it can be accessed via the host or another means.

Figure 6:
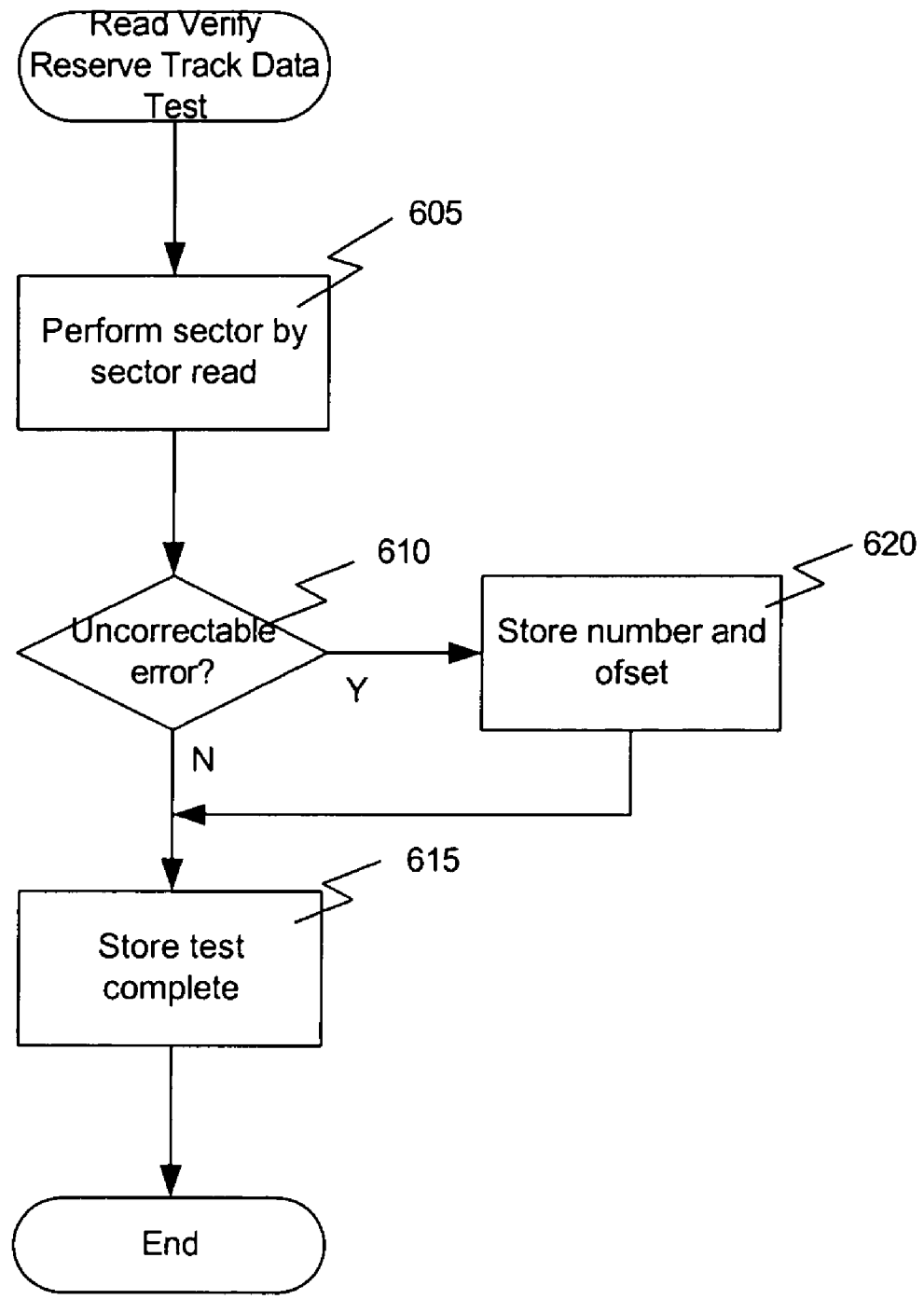
FIG. 6 is a flowchart illustrating a read verify reserve track data test that may be part of the self-test illustrated in FIG. 3.

FIG. 6 is a flowchart illustrating a read verify reserve track data test that may be part of the self-test illustrated in FIG. 3. Here, processing begins with read operation 605. Read operation 605 comprises performing a sector-by-sector read of reserve track data on a storage medium of the data storage device. Control then passes to query operation 610.

Query operation 610 comprises determining whether an uncorrectable error has been detected during the sector-by-sector read of the reserve track data on the storage medium. If a determination is made that no uncorrectable errors have been detected, control passes to store operation 615. If, however, a determination is made that one or more uncorrectable errors have been detected, control passes to store operation 620. Store operation 620 comprises storing a number of errors and an offset value for each error. That is, the collected error data may be stored in a log such as the SMART logs where it can be accessed via the host or another means. Control passes to store operation 615.

Store operation comprises storing a test complete signal in a log in memory of the data storage device. That is, the test complete signal may be stored in a log such as the SMART logs where it can be accessed via the host or another means.

Figure 7:
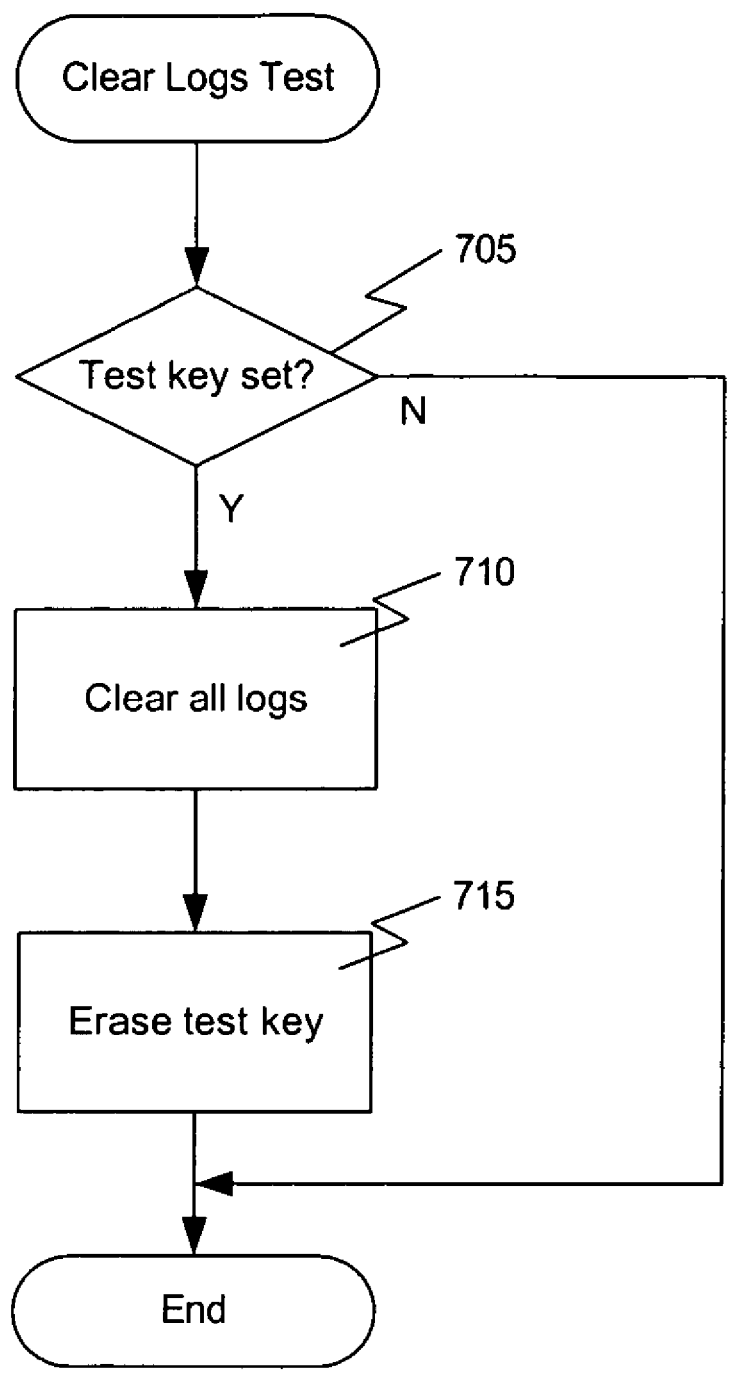
FIG. 7 is a flowchart illustrating a clear logs test that may be part of the self-test illustrated in FIG. 3

FIG. 7 is a flowchart illustrating a clear logs test that may be part of the self-test illustrated in FIG. 3. In this example, processing begins with query operation 705. Query operation 705 comprises determining whether a test key stored in a first log of a plurality of logs in memory of the data storage device has been set. That is, since this function is destructive of information in the logs, a key is used to verify the intention to perform this function. The key may be in the form of a flag or other information such as a password stored in the logs by the tester. If, at query operation 705, a determination is made that the test key has not been set, no further processing is performed. If, however, a determination is made that the test key has been properly set, control passes to set operation 710.

Set operation 710 comprises clearing all logs of the plurality of logs in memory of the data storage device. That is, all logs in the data storage device memory, such as SMART logs, are cleared. Control then passes to erase operation 715.

Erase operation 715 comprises erasing the test key. Once again, since the clear logs function is destructive, the key will be erased after use to prevent accidental re-execution of the function.

Figure 8:
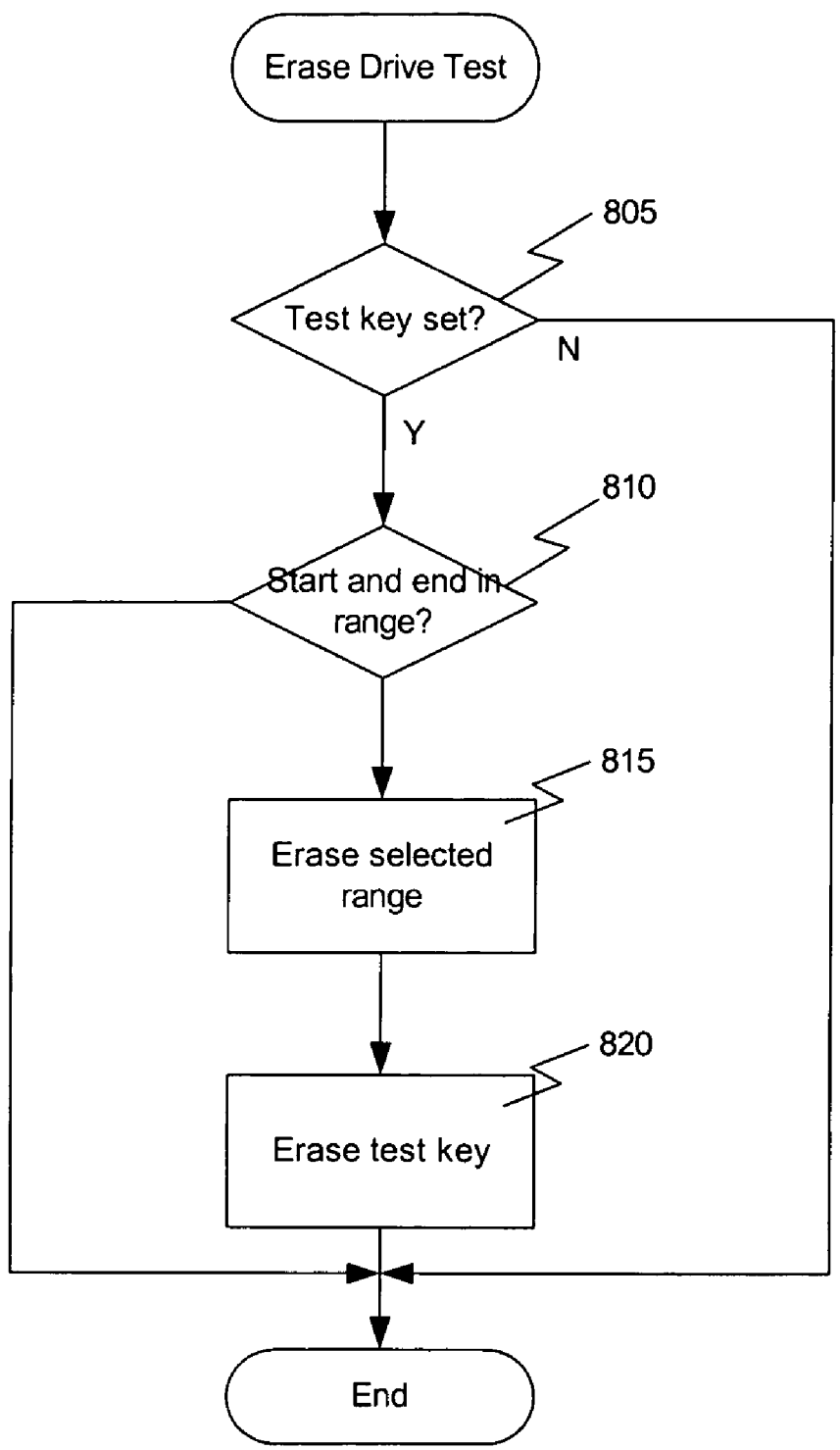
FIG. 8 is a flowchart illustrating an erase drive test that may be part of the self-test illustrated in FIG. 3.

FIG. 8 is a flowchart illustrating an erase drive test that may be part of the self-test illustrated in FIG. 3. Processing begins with query operation 805. Query operation 805 comprises determining whether a test key stored in a first log in memory of the data storage device has been set. That is, since this function is destructive of information on the storage medium, a key is used to verify the intention to perform this function. The key may be in the form of a flag or other information such as a password stored in the logs by the tester. If, at query operation 805, a determination is made that the test key has not been set, no further processing is performed. If, however, a determination is made that the test key has been properly set, control passes to query operation 810.

Query operation 810 comprises determining whether an erase start address and an erase end address stored in a second log in memory of the data storage device are within a range of addresses available on the data storage device. That is, an erase start address and an erase end address, perhaps in the form of an LBA, may be stored in the logs in the memory of the data storage device. These addresses are checked to determine whether they are valid addresses for the data storage device. If the erase start address and the erase end address stored in the second log in memory of the data storage device are not within a range of addresses available on the data storage device, no further processing is performed. However, if the start and end addresses are within the range of available addresses, control passes to erase operation 815.

Erase operation 815 comprises erasing the storage medium of the data storage device in the range specified by the erase start and erase end addresses. Control then passes to erase operation 820.

Erase operation 820 comprises erasing the test key. Once again, since the erase function is destructive, the key will be erased after use to prevent accidental re-execution of the function.

Figure 9:
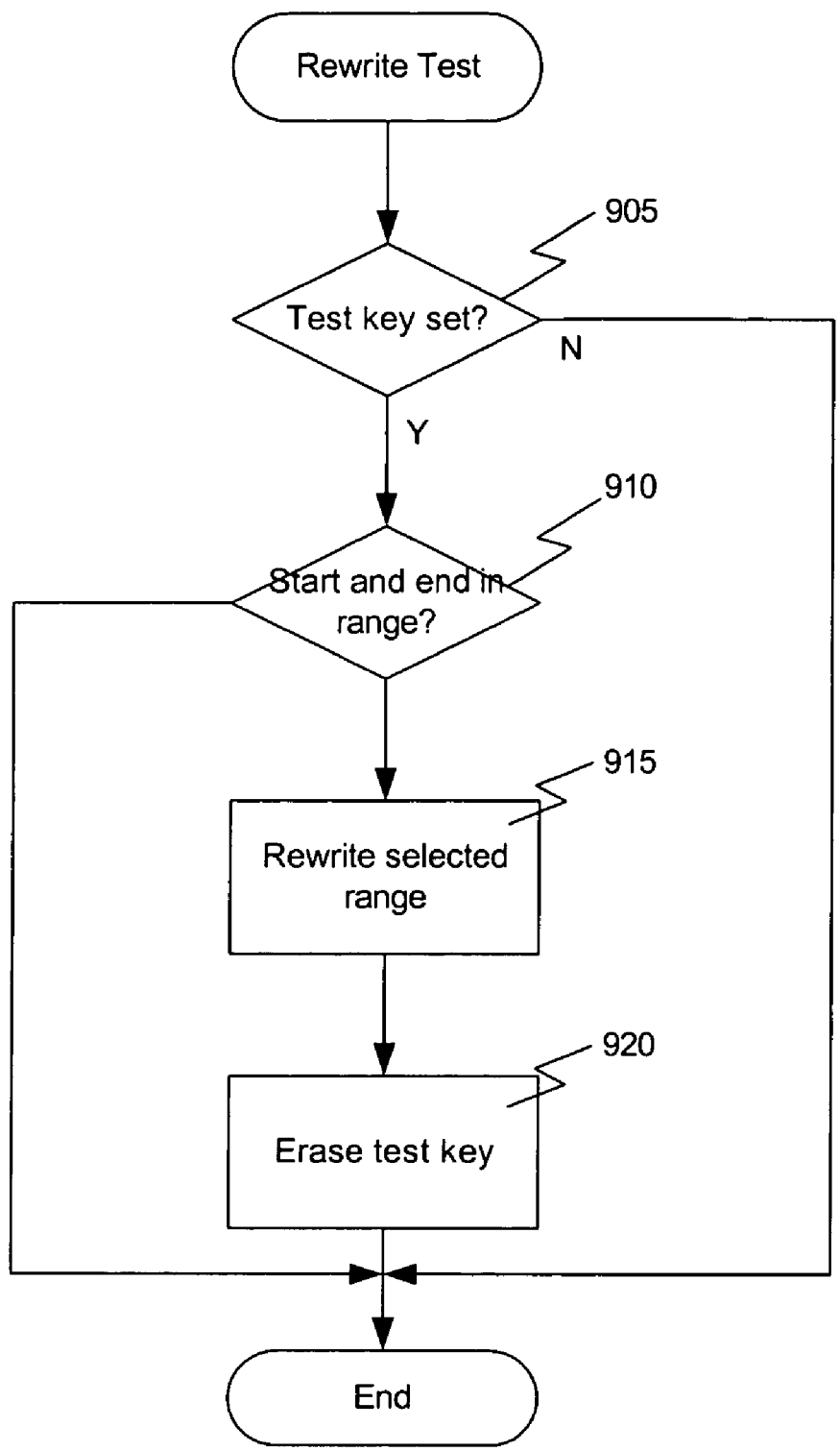
FIG. 9 is a flowchart illustrating a programmable drive write test that may be part of the self-test illustrated in FIG. 3.

FIG. 9 is a flowchart illustrating a programmable rewrite test that may be part of the self-test illustrated in FIG. 3. Here, processing begins with query operation 905. Query operation 905 comprises determining whether a test key stored in a first log in memory of the data storage device has been set. That is, since this function is destructive of information on the storage medium, a key is used to verify the intention to perform this function. The key may be in the form of a flag or other information such as a password stored in the logs by the tester. If, at query operation 905, a determination is made that the test key has not been set, no further processing is performed. If, however, a determination is made that the test key has been properly set, control passes to query operation 910.

Query operation 910 comprises determining whether a rewrite start address and a rewrite end address stored in a second log in memory of the data storage device are within a range of addresses available on the data storage device. That is, a rewrite start address and a rewrite end address, perhaps in the form of an LBA, may be stored in the logs in the memory of the data storage device. These addresses are checked to determine whether they are valid addresses for the data storage device. If the erase start address and the erase end address stored in a log in memory of the data storage device are not within a range of addresses available on the data storage device, no further processing is performed. However, if the start and end addresses are within the range of available addresses, control passes to rewrite operation 915.

Rewrite operation 915 comprises rewriting data on a storage medium of the data storage device with a value stored in a third log in memory of the data storage device in the range specified by the rewrite start and rewrite end addresses. That is, the tester may set a rewrite pattern in the logs in memory of the data storage device. This pattern will then be rewritten to all data located between the starting and ending addresses. Control then passes to erase operation 920.

Erase operation 920 comprises erasing the test key. Once again, since the rewrite function is destructive, the key will be erased after use to prevent accidental re-execution of the function.

Figure 10:
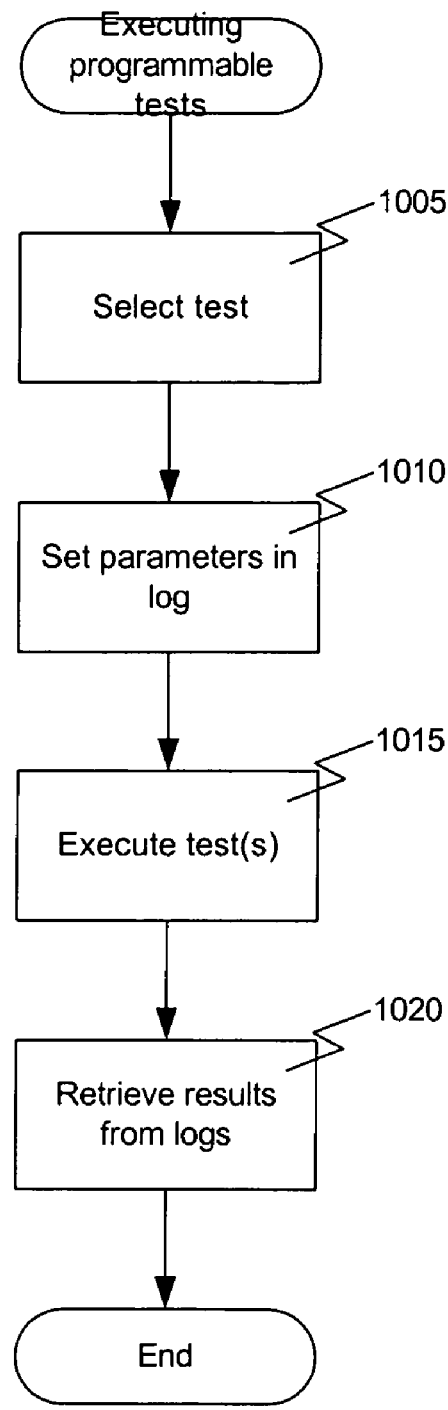
FIG. 10 is a flowchart illustrating executing host programmable tests according to one embodiment of the present invention.

FIG. 10 is a flowchart illustrating executing host programmable tests according to one embodiment of the present invention. Here, processing begins with select operation 1005. Select operation 1005 comprises selecting one or more host programmable tests stored in memory in the data storage device by setting data in a first log in memory of the data storage device. That is, the tester may select one or more of the host programmable tests but setting a flag or other data in a specific log in the memory. Control then passes to set operation 1010.

Set operation 1010 comprises setting parameters for execution of the one or more host programmable tests by setting one or more values in a second log in memory of the data storage device. In other words, the tester sets parameters such as a test key, starting address, ending address, and other parameters discussed above in the logs. Control then passes to execute operation 1015.

Execute operation 1015 comprises executing the one or more host programmable tests on the data storage device. Control then passes to read operation 1020.

Read operation 1020 comprises retrieving results of the one or more host programmable tests from a third log in memory of the data storage device. That is, the tester, through the host or by another means, reads the test results saved in the logs as indicated above.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, a self-monitoring program other than SMART may be used to provide host programmable tests. Additionally, more, fewer, or different tests than those discussed herein may be made available as host programmable tests. Numerous other changes may be made which will readily suggest themselves to those skilled in the art and which are encompassed in the spirit of the invention disclosed and as defined in the appended claims.

What is claimed is:

1. A method of executing one or more self-tests on a data storage device comprising:

selecting one or more host programmable tests stored in memory in the data storage device by setting data in a first log in memory of the data storage device, wherein the one or more host programmable tests comprises at least one test of the group consisting of a Position Error Signal (PES) test, a head error rate test, a read verify reserve data track test, a clear logs test, an erase drive test, and a rewrite test;

setting parameters for execution of the one or more host programmable tests by setting one or more values in a second log in memory of the data storage device;

executing the one or more host programmable tests on the data storage device; and storing results of the one or more host programmable tests in a third log in memory of the data storage device.

2. The method of claim 1, wherein one test of the one or more host programmable tests is the Position Error Signal (PES) test comprising:

selecting a read/write head of the data storage device and a track of a storage medium in the data storage device to be tested, the selected track accessible by the selected read/write head;

receiving a host request for servo data from the selected track;

collecting PES data from the selected track while reading the requested servo data; and storing the collected PES data in a log in memory of the data storage device.

3. The method of claim 1, wherein one test of the one or more host programmable tests is the head error rate test comprising:

selecting a range of addresses to be tested on a storage medium in the data storage device;

collecting head error rate data for the range of addresses selected; and storing the head error rate data and a test complete status in a log in memory of the data storage device.

4. The method of claim 1, wherein one test of the one or more host programmable tests is the read verify reserve data track test comprising:

performing a sector-by-sector read of reserve track data on a storage medium of the data storage device;

determining whether an uncorrectable error has been detected during the sector-by-sector read of the reserve track data on the storage medium;

responsive to determining one or more uncorrectable errors have been detected, storing a number of errors and an offset value for each error in a log in memory of the data storage device; and storing a test complete signal in the log in memory of the data storage device.

5. The method of claim 1, wherein one test of the one or more host programmable tests is the clear logs test comprising:

determining whether a test key stored in a first log of a plurality of logs in memory of the data storage device has been set; and responsive to determining that the test key has been set, clearing all logs in the plurality of logs in memory of the data storage device and erasing the test key.

6. The method of claim 1, wherein one test of the one or more host programmable tests is the erase drive test comprising:

determining whether a test key stored in a first log in memory of the data storage device has been set;

determining whether an erase start address and an erase end address stored in a second log in memory of the data storage device are within a range of addresses available on the data storage device; and responsive to determining that the test key has been set and the erase start and erase end addresses are within a range of addresses available on the data storage device, erasing a storage medium of the data storage device in the range specified by the erase start and erase end addresses and erasing the test key.

7. The method of claim 1, wherein one test of the one or more host programmable tests is the rewrite test comprising:

determining whether a test key stored in a first log in memory of the data storage device has been set;

determining whether a rewrite start address and a rewrite end address stored in a second log in memory of the data storage device are within a range of addresses available on the data storage device; and responsive to determining that the test key has been set and the rewrite start and rewrite end addresses are within a range of addresses available on the data storage device, rewriting data on a storage medium of the data storage device with a value stored in a third log in memory of the data storage device in the range specified by the rewrite start and rewrite end addresses and erasing the test key.

8. The method of claim 1, wherein executing the one or more host programmable tests on the data storage device comprises executing the one or more host programmable tests in a captive mode.

9. The method of claim 1, wherein executing the one or more host programmable tests on the data storage device comprises executing the one or more host programmable tests in an offline mode.

10. A data storage device comprising:

a storage medium;

a processor coupled to access data on the storage medium; and a memory connected with and readable by the processor and having stored therein one or more host programmable tests overwritten onto vendor specific portions of a self-monitoring program and executable by the data storage device while the data storage device is connected with a host.

11. The data storage device of claim 10, wherein the self-monitoring program is the Self-Monitoring, Analysis, and Reporting Technology (SMART) program.

12. The data storage device of claim 10 and further comprising one or more read/write heads, which access the storage medium, wherein one test of the one or more host programmable tests is a Position Error Signal (PES) test comprising:

selecting a read/write head of the data storage device and a track of the storage medium to be tested, the selected track accessible by the selected read/write head;

receiving a host request for servo data from the selected track;

collecting PES data from the selected track while reading the requested servo data; and storing the collected PES data in a log in the memory.

13. The data storage device of claim 10 and further comprising one or more read/write heads, which access the storage medium, wherein one test of the one or more host programmable tests is a head error rate test comprising:

selecting a range of addresses to be tested on the storage medium;

collecting head error rate data for the range of addresses selected; and storing the head error rate data and a test complete status in a log in the memory.

14. The data storage device of claim 10, wherein one test of the one or more host programmable tests is a read verify reserve data track test comprising:

performing a sector-by-sector read of reserve track data on the storage medium;

determining whether an uncorrectable error has been detected during the sector-by-sector read of the reserve track data on the storage medium;

responsive to determining one or more uncorrectable errors have been detected, storing a number of errors and an offset value for each error in a log in the memory; and storing a test complete signal in the log in the memory.

15. The data storage device of claim 10, wherein one test of the one or more host programmable tests is a clear logs test comprising:

determining whether a test key stored in a first log of a plurality of logs in the memory has been set; and responsive to determining that the test key has been set, clearing all logs of the plurality of logs in the memory and erasing the test key.

16. The data storage device of claim 10, wherein one test of the one or more host programmable tests is an erase drive test comprising:

determining whether a test key stored in a first log in the memory has been set;

determining whether an erase start address and an erase end address stored in a second log in the memory are within a range of addresses available on the data storage device; and responsive to determining that the test key has been set and the erase start and erase end addresses are within a range of addresses available on the data storage device, erasing the storage medium in the range specified by the erase start and erase end addresses and erasing the test key.

17. The data storage device of claim 10, wherein one test of the one or more host programmable tests is a rewrite test comprising:

determining whether a test key stored in a first log in the memory has been set;

determining whether a rewrite start address and a rewrite end address stored in a second log in the memory are within a range of addresses available on the data storage device; and responsive to determining that the test key has been set and the rewrite start and rewrite end addresses are within a range of addresses available on the data storage device, rewriting data on the storage medium with a value stored in a third log in the memory in the range specified by the rewrite start and rewrite end addresses and erasing the test key.

18. The data storage device of claim 10, wherein the one or more host programmable tests are executable in a captive mode.

19. The data storage device of claim 10, wherein the one or more host programmable tests are executable in an offline mode.

20. A method of executing one or more self-tests on a data storage device comprising:

selecting one or more host programmable tests stored in memory in the data storage device by setting data in a first log in memory of the data storage device;

setting parameters for execution of the one or more host programmable tests by setting one or more values in a second log in memory of the data storage device;

executing the one or more host programmable tests on the data storage device in a captive mode in which host-initiated commands are ignored; and storing results of the one or more host programmable tests in a third log in memory of the data storage device.

* * * * *